US006801163B2

(12) United States Patent
Baugh et al.

(10) Patent No.: US 6,801,163 B2
(45) Date of Patent: *Oct. 5, 2004

(54) SYSTEM AND METHOD FOR WIDEBAND PRE-DETECTION SIGNAL PROCESSING FOR PASSIVE COHERENT LOCATION APPLICATIONS

(75) Inventors: Kevin W. Baugh, Gaithersburg, MD (US); Robert H. Benner, Gaithersburg, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/138,510

(22) Filed: May 6, 2002

(65) Prior Publication Data

US 2002/0198650 A1 Dec. 26, 2002

Related U.S. Application Data

(60) Provisional application No. 60/288,451, filed on May 4, 2001.

(51) Int. Cl.[7] .................................................. G01S 3/02
(52) U.S. Cl. ...................................................... 342/451
(58) Field of Search ................................ 342/450, 451, 342/452

(56) References Cited

U.S. PATENT DOCUMENTS

| | | | |
|---|---|---|---|
| 3,242,487 A | 3/1966 | Hammack | |
| 3,270,340 A | 8/1966 | Hammack | |
| 3,286,263 A | 11/1966 | Hammack | |
| 3,573,611 A | 4/1971 | Bergemann et al. | .......... 324/57 |
| 3,706,096 A | 12/1972 | Hammack | |
| 3,721,986 A | * 3/1973 | Kramer | .................. 343/112 R |
| 3,786,509 A | 1/1974 | Applebaum et al. | ....... 343/17.1 |

(List continued on next page.)

FOREIGN PATENT DOCUMENTS

| | | |
|---|---|---|
| DE | 38 18 813 C | 6/1999 |
| EP | 95303020.2 | 5/1995 |
| FR | 2 776 438 A | 9/1999 |

OTHER PUBLICATIONS

International Search Report dated Feb. 3, 2003, for Application No. PCT/US02/14069.

(List continued on next page.)

*Primary Examiner*—Dao Phan
(74) *Attorney, Agent, or Firm*—Marsh Fischmann & Breyfogle LLP (57) ABSTRACT

A system and method for wideband pre-detection signal processing for PCL applications is disclosed. The method includes receiving an input signal, implementing a transformation operation on the input signal, compensating the input signal for channel distortion, demodulating and forming complex-valued representations of the compensated input signal, estimating a reference signal and a target signal from the demodulated input signal, reducing a portion of the reference signal in the target signal, wherein the reference signal is adaptively filtered with respect to the target signal and combined with the target signal to form an output target signal, implementing an inverse transformation operation on the output target signal and the reference signal, forming a plurality of target beams for the output target signal, forming a plurality of decimated lag products for each of the plurality of target beams, forming a plurality of decimated lag products for the reference signal, estimating a cross ambiguity function for the each of plurality of target beams using the plurality of decimated lag products for each of the plurality of target beams, and estimating an auto ambiguity function for the reference signal using the plurality of decimated lag products for the reference signal.

60 Claims, 8 Drawing Sheets

Target Signal Lag Product Formation and Decimation

U.S. PATENT DOCUMENTS

| | | | |
|---|---|---|---|
| 3,795,911 A | 3/1974 | Hammack | 343/9 |
| 3,972,000 A | 7/1976 | Desblache et al. | 329/105 |
| 4,114,153 A | 9/1978 | Neidell | 343/9 |
| 4,994,809 A | 2/1991 | Yung et al. | 342/108 |
| 5,130,952 A | 7/1992 | Feintuch et al. | |
| 5,192,955 A | 3/1993 | Hoang | 342/80 |
| 5,252,980 A | 10/1993 | Gray et al. | 342/59 |
| 5,381,156 A | 1/1995 | Bock et al. | 342/126 |
| 5,451,960 A | 9/1995 | Kastella et al. | 342/59 |
| 5,525,995 A | 6/1996 | Benner | 342/90 |
| 5,604,503 A | 2/1997 | Fowler et al. | 342/378 |
| 5,623,267 A | 4/1997 | Wurman | 342/26 |
| 5,912,640 A | 6/1999 | Bradford et al. | 342/99 |
| 5,943,170 A | 8/1999 | Inbar et al. | 359/561 |
| 5,990,831 A | 11/1999 | McDowell | 342/378 |
| 6,031,879 A | 2/2000 | Pace et al. | 375/316 |
| 6,052,421 A | 4/2000 | Richardson et al. | 375/346 |
| 6,057,877 A | 5/2000 | Limberg | 348/21 |
| 6,133,873 A | 10/2000 | Krasner | 342/357.12 |

OTHER PUBLICATIONS

Article entitled "On the Application of the LMS–Based Adaptive Noise Canceller in Nonstationary Environment Associated with Airborne Doppler Weather Radar," IEEE, dated Apr. 27, 1993.

Article entitled "Parallel Adaptive Filter Structures For Acoustic Noise Cancellation," IEEE, dated May 10, 1992.

Schwenke, Roger W., Sensitivity Analysis of an Estimator–Correlator for the Detection of Spread Targets with Multiple Discrete Highlights, The Pennsylvania State University, Dec. 2000, pp 1–13.

Holt, J.M. et al., MIDAS–W: a workstation–based incoherent scatter radar data acquisition system, Massachusetts Institute of Technology, Jun. 2000, pp 1231–1241.

Martinez, David R., Application of Parallel Processors to Real–Time Sensor Array Processing, MIT Lincoln Laboratory, pp 1–7.

Jianqi, Wu, et al., Researches of a New Kind of Advanced Metric Wave Radar, East of China Research Institute of Electronic Engineering, 1999, pp. 194–197.

* cited by examiner

SYSTEM AND METHOD FOR WIDEBAND PRE-DETECTION SIGNAL PROCESSING FOR PASSIVE COHERENT LOCATION APPLICATIONS

CROSS REFERENCE TO RELATED APPLICATIONS

This application claims benefit of U.S. Provisional Patent Application No. 60/288,451 entitled System and Method for Wideband Pre-Detection Signal Processing for PCL Applications, filed May 4, 2001, which is hereby incorporated by reference.

BACKGROUND OF THE INVENTION

1. Field of the Invention

The present invention relates to PCL (passive coherent location) applications, and more particularly, to a system and method for wideband pre-detection signal processing for PCL applications.

2. Discussion of the Related Art

Radar systems detect the presence of a target of interest and provide information about that target. Conventional radar systems include pulsed radar and continuous wave radar. In pulsed radar, the measure of target distance is determined by the measurement of the time elapsed from the transmission of an electromagnetic energy pulse to the reception of its reflected energy. In continuous wave radar, a continuous wave is transmitted. The target distance is determined through the measurement of the frequency shift between the transmitted signal and the received reflected signal.

Conventional radar systems transmit electromagnetic energy. A portion of the transmitted electromagnetic energy is reflected off a target of interest and scattered in the space. The radar system receives the reflected energy and extracts the information about the target of interest by correlating the received reflected energy with replicas of the transmitted energy.

Passive radar systems, in contrast to conventional radar systems, exploit electromagnetic energy transmitted from uncontrolled illuminators, such as commercial broadcast FM radio signals and television broadcast signals. Passive radar systems receive reflected signals, which are the signals transmitted from uncontrolled illuminators and reflected off the target of interest, and direct path signals from the uncontrolled illuminators. The passive radar systems extract the information about the target of interest by correlating the received reflected signals with the received direct path signals used as a reference signal.

PCL (passive coherent location) system is a passive surveillance system including multi-static wide area moving target surveillance sensors. PCL technology provides detection capability without transmitting energy. In a PCL system, tracking accuracy and resolution are important.

SUMMARY OF THE INVENTION

Accordingly, the present invention is directed to a PCL application and method for signal processing for a PCL application.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, A method for wideband pre-detection signal processing in PCL applications includes a first reference signal and a first target signal, filtering the first reference signal with respect to the first target signal using a filter to form a first output reference signal, combining the first output reference signal with the first target signal to form a first output target signal, receiving a second reference signal and a second target signal, updating the filter with respect to a change between the first target signal and the second target signal, filtering the second reference signal using the updated filter to form a second output reference signal, and combining the second output reference signal with the second target signal to form a second output target signal.

In another aspect of the present invention, a method for wideband pre-detection signal processing in PCL applications includes receiving a target signal and a reference signal, forming a plurality of target beams from the target signal, forming a plurality of lag products for each of the plurality of target beams, decimating each of the plurality of lag products for each of the plurality of target beams, forming a plurality of lag products for the reference signal, and decimating each of the plurality of lag products for the reference signal.

In another aspect of the present invention, a method for wideband pre-detection signal processing for Passive Coherent Location (PCL) applications includes receiving an input signal, estimating a reference signal and a target signal from the input signal, reducing a portion of the reference signal in the target signal, wherein the reference signal is adaptively filtered with respect to the target signal and combined with the target signal to form an output target signal, forming a plurality of target beams for the output target signal, forming a plurality of decimated lag products for each of the plurality of target beams, and forming a plurality of decimated lag products for the reference signal.

In another aspect of the present invention, a method for wideband pre-detection signal processing in PCL applications includes receiving an input signal, extracting a target signal and a reference signal from the input signal, implementing a transformation operation on the target signal and the reference signal, compensating the transformed target signal and the transformed reference signal for channel distortion, reducing a portion of the compensated reference signal in the compensated target signal, wherein the compensated reference signal is adaptively filtered with respect to the compensated target signal and combined with the compensated target signal to form an output target signal, demodulating and forming complex-valued representations of the compensated reference signal and the output target signal, implementing an inverse transformation on the compensated reference signal and the output target signal, forming a plurality of target beams for the output target signal, forming a plurality of decimated lag products for each of the plurality of target beams, forming a plurality of decimated lag products for the compensated reference signal, estimating a cross ambiguity function for the each of plurality of target beams using the plurality of decimated lag products for each of the plurality of target beams, and estimating an auto ambiguity function for the reference signal using the plurality of decimated lag products for the reference signal.

In another aspect of the present invention, a system for pre-detection signal processing for wideband in PCL applications including a first functional element includes a first sub-element for receiving a first reference signal and a first target signal, and a second reference signal and a second target signal in series, a second sub-element for filtering the first reference signal with respect to the first target signal using a filter to form a first output reference signal, a third sub-element for combining the first output reference signal with the first target signal to from a first output target signal, and a forth sub-element for updating the second element with respect to a change between the first target signal and the second target signal.

In another aspect of the present invention, a system for pre-detection signal processing for wideband in PCL applications including a first functional element includes a first sub-element for receiving a target signal and a reference signal, a second sub-element for forming a plurality of target beams for the target signal, a third sub-element for forming a plurality of lag products for each of the plurality of target beams, a fourth sub-element for decimating each of the plurality of lag products for each of the plurality of target beams, a fifth sub-element for forming a plurality of lag products for the reference signal, and a sixth sub-element for decimating each of the plurality of lag products for the reference signal.

In another aspect of the present invention, a system for pre-detection signal processing for wideband in PCL applications includes first functional element for receiving an input signal including a target signal and a reference signal, a second functional element for implementing a transformation operation on the target signal and the reference signal, a third functional element for compensating the transformed target signal and the transformed reference signal for channel distortion, a fourth functional element for reducing a portion of the compensated reference signal in the compensated target signal, wherein the compensated reference signal is adaptively filtered with respect to the compensated target signal and combined with the compensated target signal to form an output target signal, a fifth functional element for demodulating and forming complex-valued representations of the compensated reference signal and the output target signal, a sixth functional element for forming a plurality of target beams for the output target signal, and a seventh functional element for forming a plurality of decimated lag products for each of the plurality of target beams and a plurality of decimated lag products for the reference signal.

In another aspect of the present invention, a system for pre-detection signal processing for wideband in PCL applications includes a first functional element for receiving an input signal, a second functional element for implementing a transformation operation on the input signal, a third functional element for compensating the transformed input signal for channel distortion, a fourth functional element for demodulating and forming complex-valued representations of the compensated input signal, a fifth functional element for estimating a target signal and a reference signal from the input signal received from the fourth functional element, a sixth functional element for reducing a portion of the reference signal in the target signal, wherein the reference signal is adaptively filtered with respect to the target signal and combined with the target signal to form an output target signal, a seventh functional element for forming a plurality of target beams for the output target signal, and an eighth functional element for forming a plurality of decimated lag products for each of the plurality of target beams and a plurality of decimated lag products for the reference signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitutes a part of this specification, illustrate embodiments of the invention and together with the description serves to explain the principles of the invention. In the drawings.

DETAILED DESCRIPTION OF THE PREFERRED EMBODIMENTS

Reference will now be made in detail to the preferred embodiment of the present invention, examples of which are illustrated in the accompanying drawings.

Figure 1:
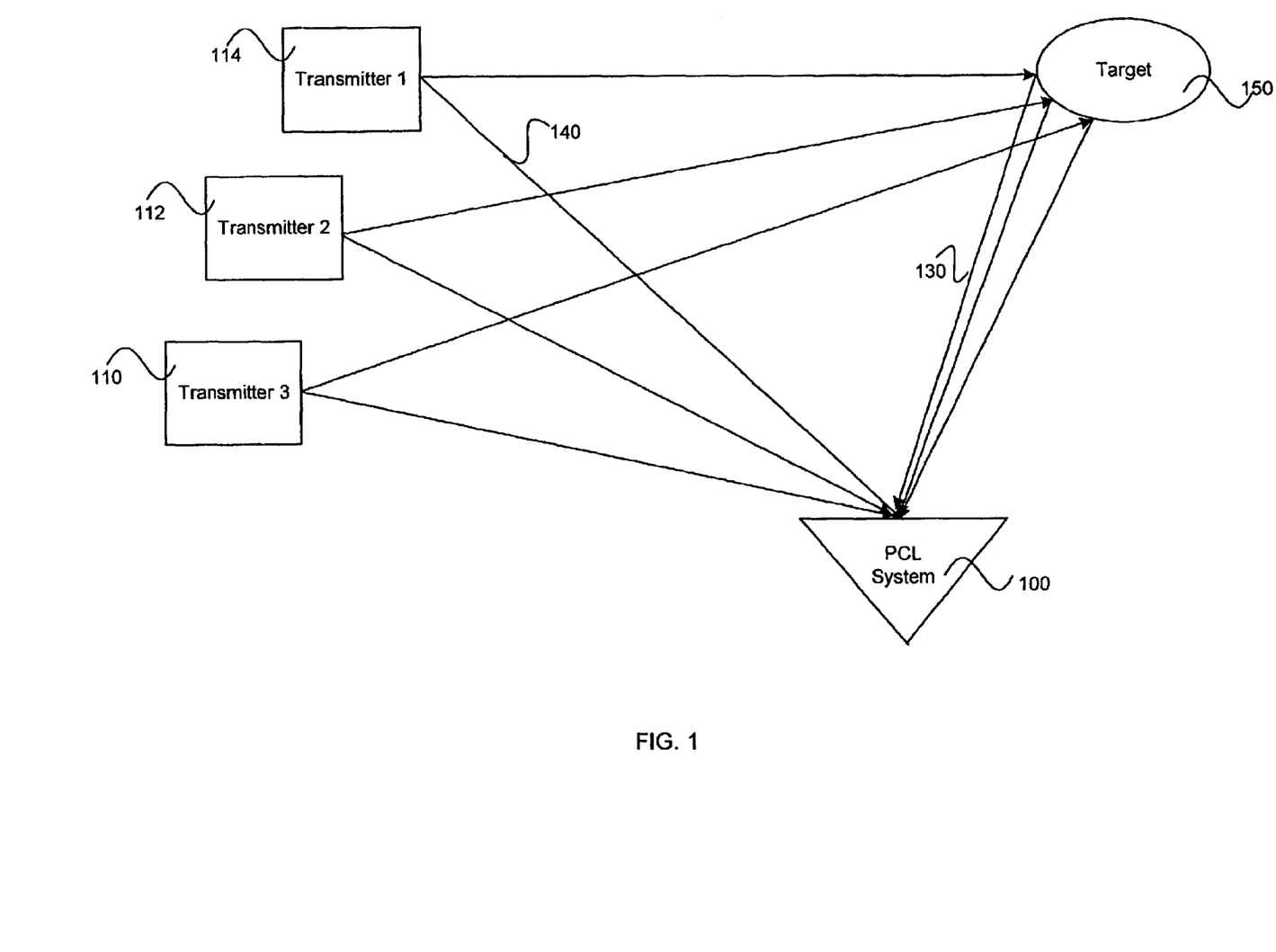
FIG. 1 illustrates a block diagram of a plurality of transmitters, a target and a PCL system in accordance with the present invention.

FIG. 1 shows a block diagram of a PCL application in accordance with an embodiment of the present invention. The PCL application includes a plurality of uncontrolled illuminators, represented in FIG. 1 as transmitters 110, 112 and 114, a target of interest 150 and a PCL system 100. The plurality of transmitters 110, 112 and 114 may include uncontrolled wideband illuminators, such as commercial FM broadcast transmitters and/or repeaters and commercial HDTV TV broadcast transmitters and/or repeaters. Example of the target of interest 150 includes aircraft.

The transmitters 110, 112 and 114 transmit electromagnetic energy signals in all directions. Some of the transmitted signals are reflected by the target of interest 150 and scattered in all directions. The PCL system 100 receives some of the scattered signals, referred to as target path signals 130. Separately, PCL system 100 receives some of the signals directly from the transmitters 110, 112 and 114. These signals are referred to as reference path signals (or direct path signals) 140.

Figure 2:
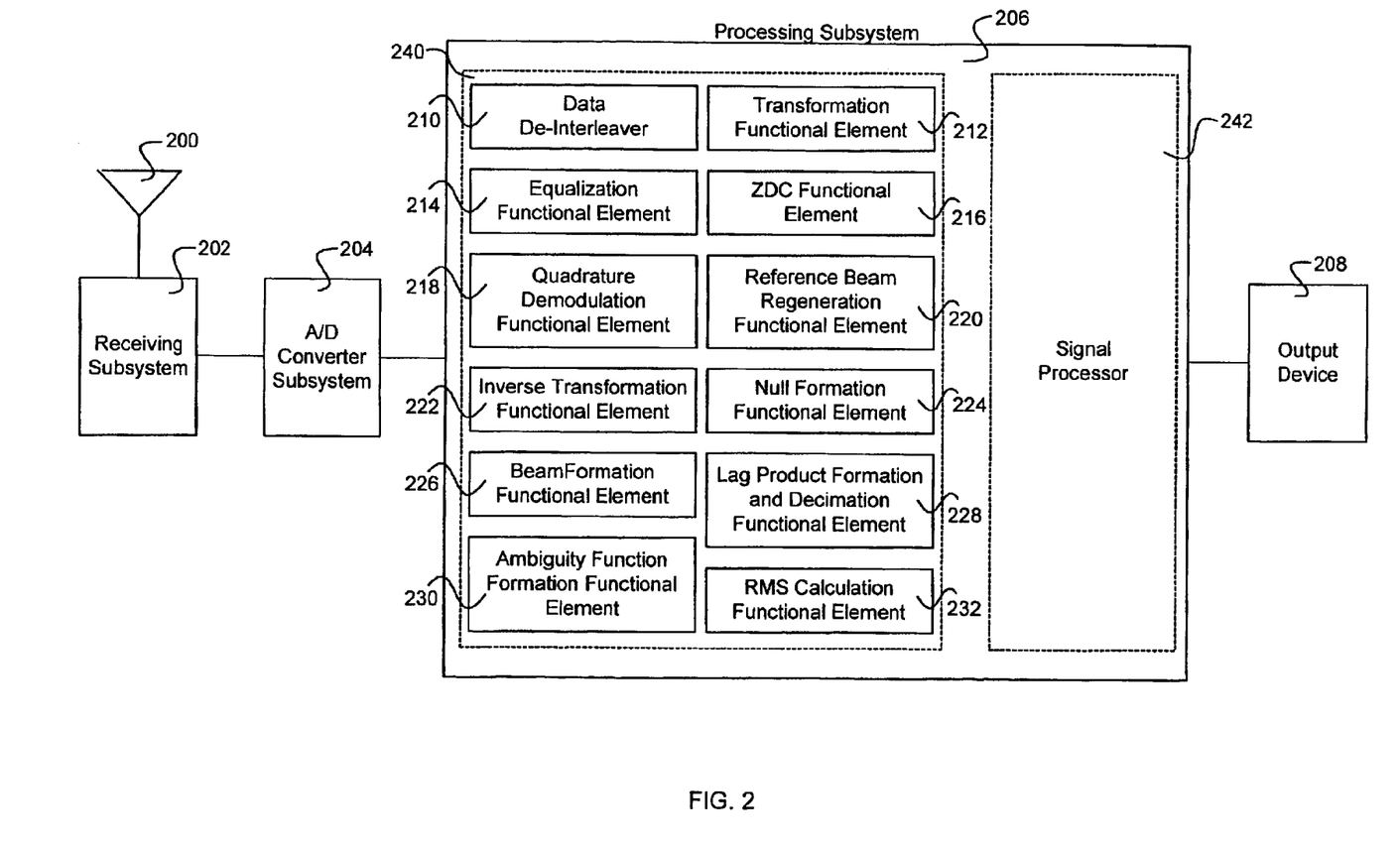
FIG. 2 illustrates a block diagram of a passive coherent location system in accordance with an embodiment of the present invention.

FIG. 2 shows an embodiment of a PCL 100 in accordance with the present invention. Turning to FIG. 2 in particular, the PCL 100 includes an antenna 200, a receiving subsystem 202, an A/D converter subsystem 204, a processing subsystem 206, and a display 208.

The antenna 200 receives a reference path signal 140 from uncontrolled illuminators, including transmitters 110, 112, and 114. The antenna 200 also receives a target path signal 130 reflected from the target of interest 150. The antenna 200 communicates the reference path signal 140 and the target path signal 130 to the receiving subsystem 202.

The receiving subsystem 202 receives the reference path digital signal 140 and the target path signal 130 from the antenna 200 and processes the signals accordingly. The receiving subsystem 202 may include a transducer.

The A/D converter subsystem 204 receives the output of the receiving subsystem 202 and outputs digital samples of the signals at its input by sampling the signals at desired sampling rate and forms a digital waveform using the magnitude of the analog signals at each sampling time. The AID converter subsystem 204 may include an amplifier to amplify the received signal.

The processing subsystem 206 receives the digital samples of the received signals from the A/D converter subsystem 204. The processing subsystem processes the received reference signal and target signal to extract information about target of interest 150. The information may includes any information relating to a position of target of interest 110, including location, velocity, and acceleration.

The processing subsystem 206 may includes sub-processors. The sub-processors may include a pre-detection signal processor 240 for removing errors to provide optimized signals and a signal processor 242 for extract information about target of interest 150. The pre-detection signal processor 240 may include data de-interlever functional element 210, transformation functional element 212, equalization functional element 214, ZDC (zero-doppler cancellation) functional element 216, quadrature demodulation functional element 218, reference beam regeneration functional element 220, inverse transformation functional element 222, null formation functional element 224, beam formation functional element 226, lag product formation and decimation functional element 228, ambiguity function formation functional element 230 and RMS calculation functional element 232, as shown in FIG. 2. The processing subsystem may include a high performance computer with data storage capabilities, which is programmed to as to perform the functions of the various elements. Alternatively, hardware elements may be used as some or as all of the elements of the pre-detection processing subsystems.

The output device 208 receives and displays the information received from the processing subsystem 206. The subsystems 202, 204, 206 and 208 may be connected to each other through a high-speed network.

Figure 3:
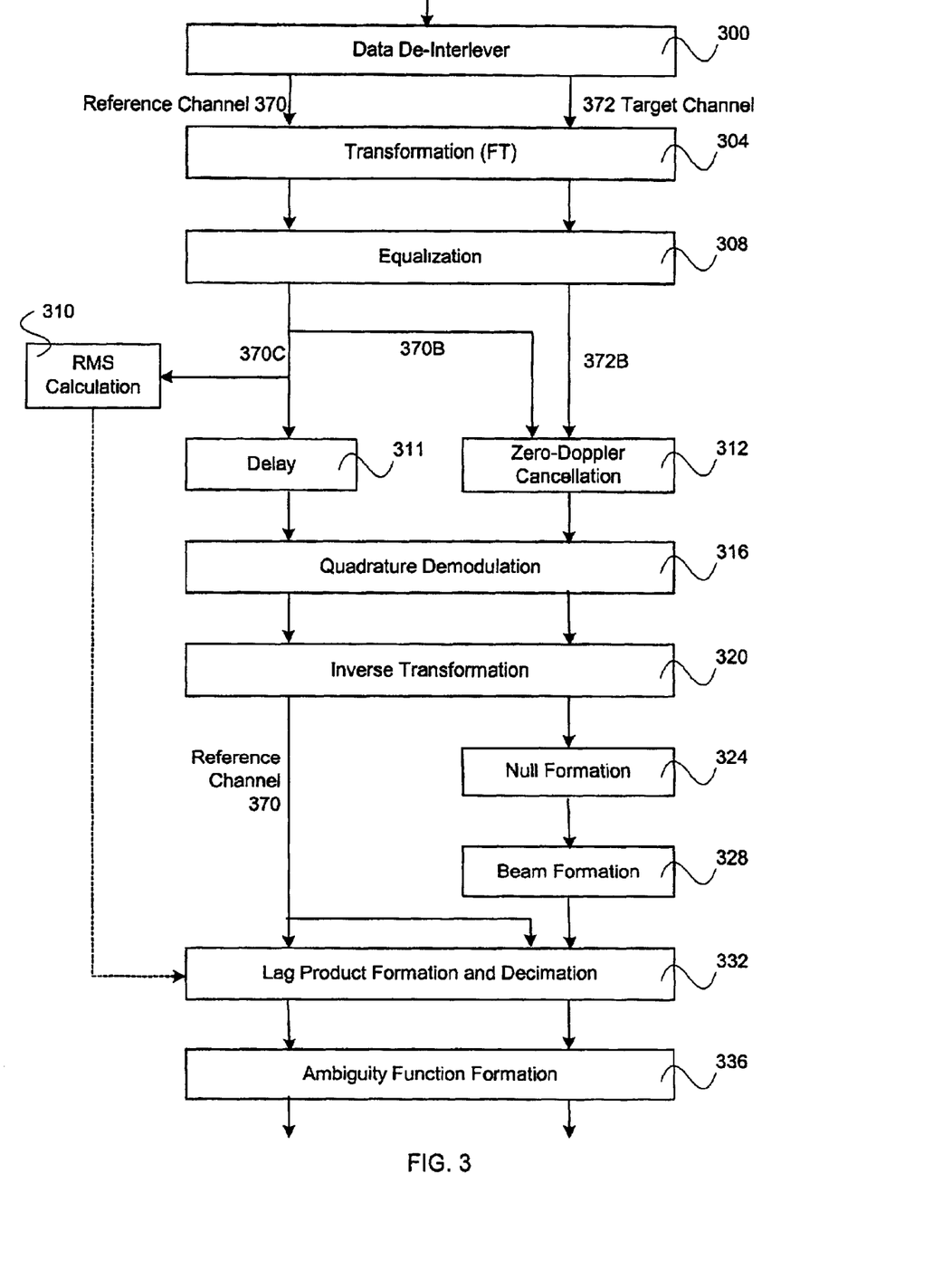
FIG. 3 illustrates a flow chart for pre-detection signal processing in the passive coherent location system in accordance with an embodiment of the present invention.

FIG. 3 shows signal processing steps at the pre-detection signal processor 240 in accordance with an embodiment of the present invention.

Beginning at step 300, pre-detection signal processor receives digital samples of a target path signal 130 and a reference path signal 140 received at the antenna 200 from the A/D converter subsystem, as blocks of ADC time series data multiplexed together. The blocks of ADC time series data multiplexed together are received by the data de-interlever functional element. The data de-interleaving functional element extracts reference signal data and target signal data from the input blocks of time series data as required by the subsequent filtering operations in a manner which is well known by those skilled in the art, and applies an appropriate ADC scale factor for parallel processing. The reference signal data is passed through a reference channel 370 and the target signal data is passed through a target channel 372.

In step 304, the data transformation functional element receives the reference signal data and the target signal data through the reference channel 370 and the target channel 372, respectively. The data transformation functional element implements DFT (discrete Fourier transform), preferably by using FFT (fast Fourier transform) operation, required by the subsequent filtering operations. The FFT transforms the input data from a time function to a frequency function, in a manner which is well known by those skilled in the art. Preferably, overlap-save FFT operation may be implemented to cover all ranges, in a manner which is well known by those skilled in the art. The overlap-save FFT operation is repeated independently for each time series data of interest, thus providing a unique "save" block and DFT (discrete Fourier transform) output for each of the target signal data and each of the reference signal data. Preferably, DFT length, N, may be chosen so that it can be factored into a product of small integers (e.g., 2, 3, 4, or 5) so that efficient FFT technique can be used to implement the 2N-length DFT.

In step 308, the equalization functional element receives the output of the data transformation functional element through the reference channel and the target channel. The equalization functional element applies filters to each of the reference signal data and the target signal data. The filters minimize amplitude ripple over about 50 kHz band centered around the carrier frequency of interest, minimize the target signal-to-reference differential group delay which is a difference of the rate of phase shift with respect to frequency between the target signal data and the reference signal data, and minimize the differential gain which is a difference of a ratio of signal-to-noise ratio and phase errors between the target signals. The filters may be obtained through an off-line calibration procedure. The equalization functional element compensates an intersymbol interference (ISI) which is an overlapping of successively transmitted signals within a channel due to its dispersion of the frequencies constituting the signal. The equalization functional element minimizes the probability of error by compensating for channel distortion. The equalization procedure is repeated independently for each time series of the data.

In step 312, the zero-doppler cancellation functional element 216 implements an adaptive zero-doppler cancellation, the time-domain signal processing operation, to the received target signal data to minimize the portion of the reference signal data present in the target signal data.

Figure 4:
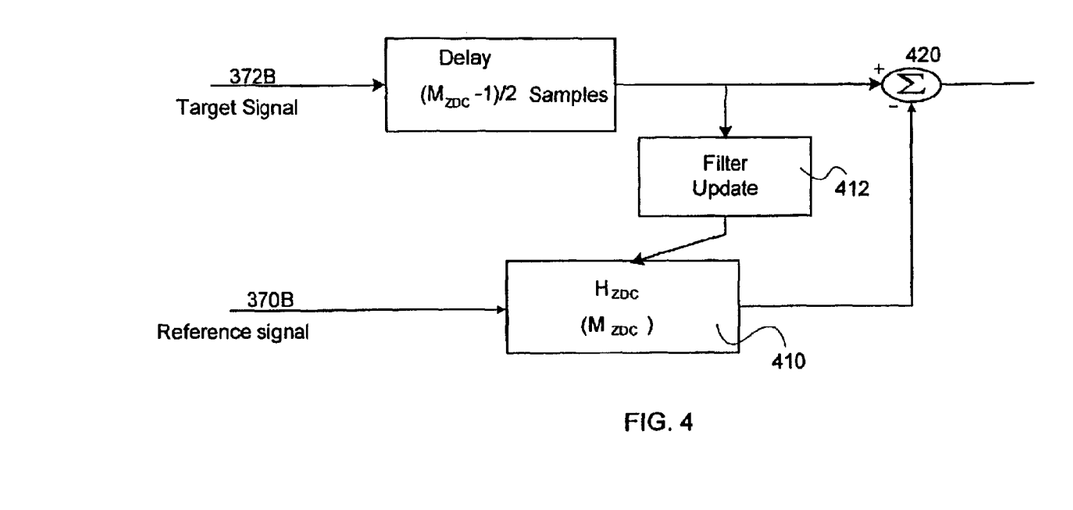
FIG. 4 illustrates a schematic view of zero-doppler cancellation process in accordance with an embodiment of the present invention.

FIG. 4 shows the adaptive zero-doppler cancellation at the pre-detection signal processor 240 in accordance with an embodiment of the present invention.

In FIG. 4, the zero-doppler cancellation functional element 216 receives the time series target signal data and the time series reference signal data through a reference channel 370B and a target channel 372B, respectively. The first reference signal data received is filtered with respect to the first target signal data received with a filter 410. The filtered first reference signal data received is combined with the first target signal data received at 420 to minimize the portion of the first reference signal data received present in the first target signal data received. Then, the filter update functional element 412 updates the filter 410 with respect to the second target signal data received by comparing the filter with the second target signal data received. The second reference signal data received through the reference channel 370B is filtered with the filter 410 that is updated with respect to the second target signal data received. Then, the filtered second reference signal data received is combined with the second target signal data received at 420. The filter 410 is continuously updated by the filter update functional element 412 with respect to each of the time series of the target signal data received through the target channel 372B by continuously comparing the filter to the each of the time series of the target signal data. The reference signal data is adaptively filtered. Each of the filtered times series of the reference signal data is combined with the each of the time series of the target signal data at 420. The filter 410 may include an adaptive Wiener filter, for example. By applying the adaptive zero-doppler cancellation, more accurate target signal data for a moving target can be produced.

Separately, in step 310, the RMS (root mean square) bandwidth calculation functional element receives the reference signal data through reference channel 370C and estimates RMS value of a bandwidth of the reference signal data. This value is needed in the calculation of the variance of the delay measurement performed in detection and feature extraction processing.

In step 316, the quadrature demodulation functional element receives the reference data signal from the equalization function element through delay element in 311 and the output of the zero-doppler cancellation functional element. The quadrature demodulation functional element implements the time-domain signal processing operation schematically shown in FIG. 5 in accordance with an embodiment of the present invention.

Figure 5:
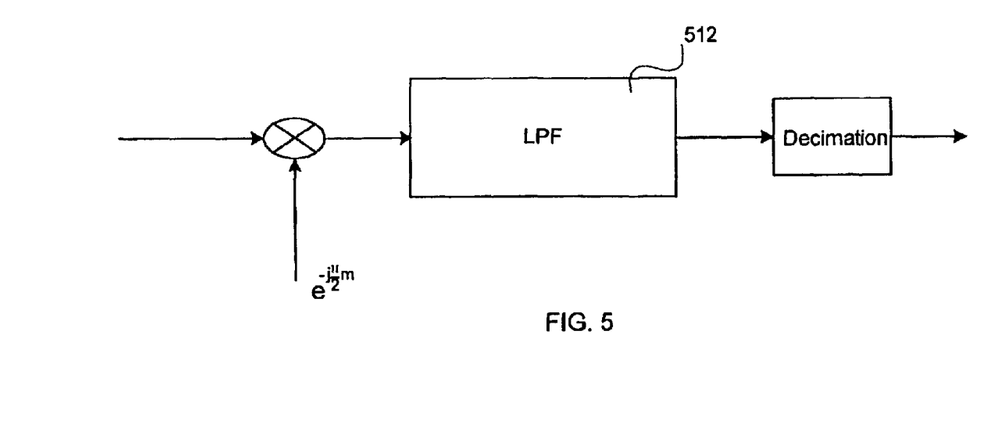
FIG. 5 illustrates a schematic view of quadrature demodulation process in accordance with an embodiment of the present invention.

In FIG. 5, the phase of the real-valued signal data is shifted by multiplying with $$\exp\left(-j\left(\frac{\pi}{2}\right)m\right).$$

Then, the phase shifted real-valued signal data is filtered with a low-pass filter 512, such as a FIR LPF (finite impulse response low pass filter), and decimated to produce complex-valued signal data. A real-valued input times series data is demodulated and decimated to produce a complex (quadrature) representation of the time series which is centered at zero radians per sample and has a reduced sample rate. By finding a complex envelope, which is a low-pass function with the in-phase component and the quadrature component in the quadrature representation, analysis of a band-pass system, which is complicated by the presence of the multiplying factor $$\exp\left(-j\left(\frac{\pi}{2}\right)m\right)$$

is replaced by an equivalent, but much simpler low-pass analysis that completely retains the essence of the filtering processes. The quadrature demodulation functional element implements the signal processing operation in FIG. 5 to the received target signal data and the received reference signal data, separately.

In step 320, the inverse transformation functional element accepts the target signal data and the reference signal data produced by the quadrature demodulation functional element and implements inverse transformation, in a manner which is well known by those skilled in the art. Preferably, $B/2=N-(M_{EFF}-1)/2$ length blocks of complex-valued time series for the signals of interest may be produced.

In step 324, the null formation occurs.

In step 328, the beam formation functional element accepts the target signal data produced by the proceeding functional elements and combines them to form target beams which have selectivity along specific lines of azimuth and elevation.

Figure 6:
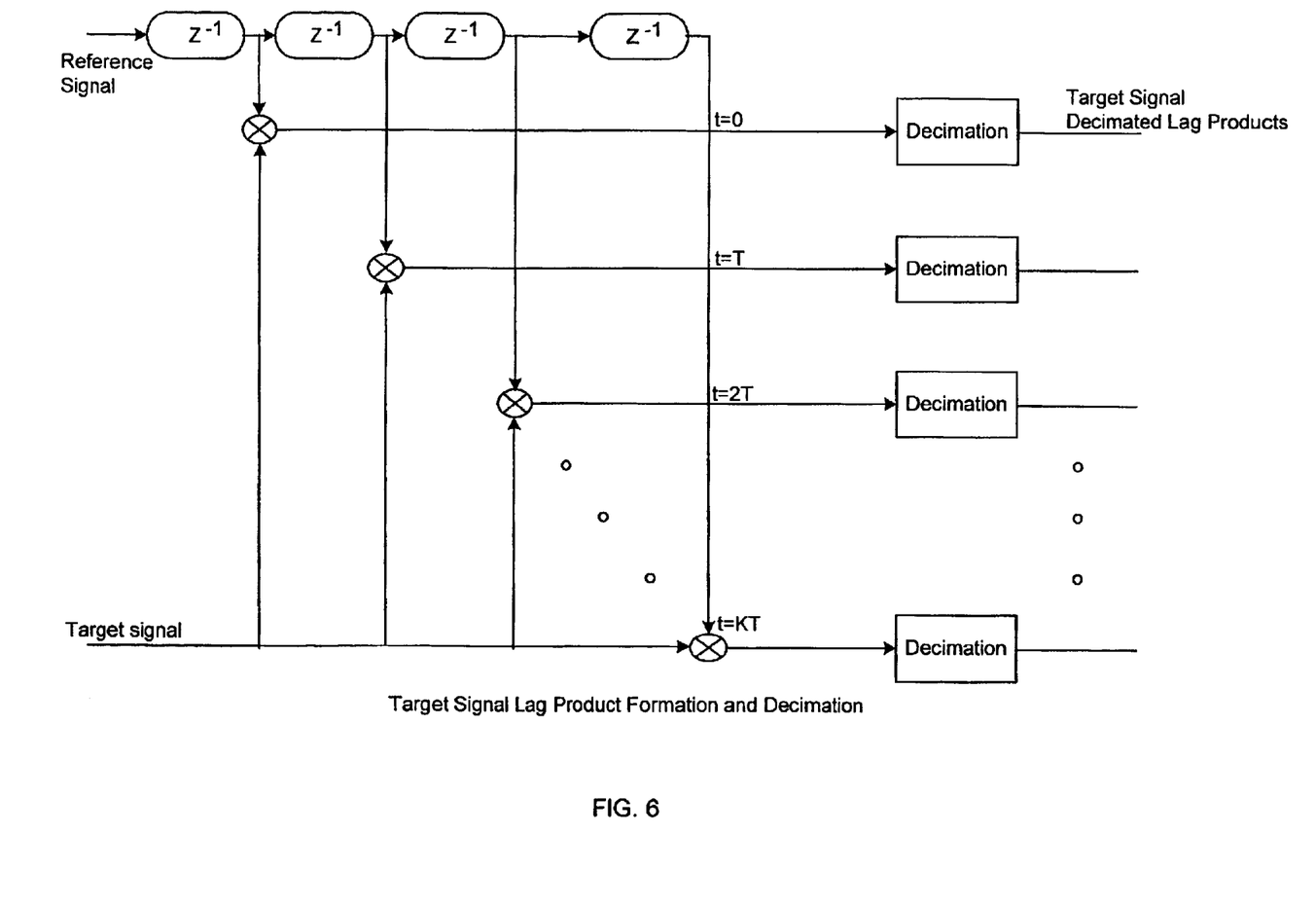
FIG. 6 illustrates a schematic view of target beam lag product formation and decimation process in accordance with an embodiment of the present invention.
Figure 7:
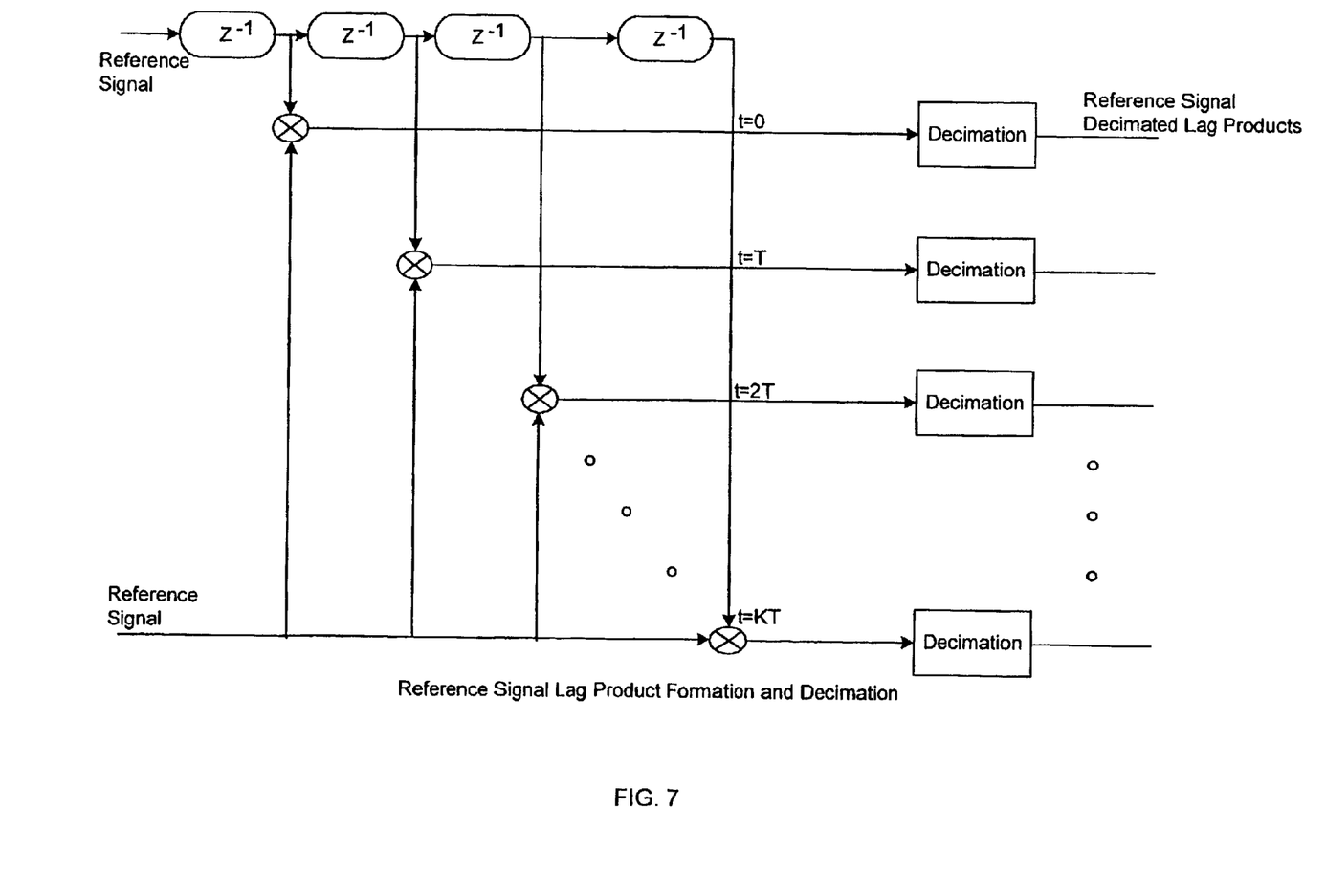
FIG. 7 illustrates a schematic view of reference lag product formation and decimation process in accordance with an embodiment of the present invention.

In step 332, the lag product formation and decimation functional element receives the target beams and the reference signal produced by the preceding functional elements and implements the signal processing function shown schematically in FIGS. 6 and 7. The operation is implemented entirely in the time domain.

In FIG. 6, the lag product formation is implemented on each of the target beams with the reference signal data to form a plurality of lag products for the each of the target beams. The plurality of lag products for the each of the target beams are decimated to form a plurality of decimated lag products for the each of the target beams.

In FIG. 7, the lag product formation is implemented on the reference signal. A plurality of lag products are formed for the reference signal. The plurality of lag products for the reference signal are decimated to form a plurality of decimated lag products for the reference signal.

The decimation rate may have a value of 16 or 32. The decimation operation may be implemented using a highly-efficient multi-stage finite impulse response (FIR) filter/decimator. Each of the target signals is processed independently to produce K decimated lag product time series in order to estimate a cross-ambiguity surface for the target signal. By producing the plurality of the lag products for the each of the target beam, the cross-ambiguity surface for the each of the target beams may be estimated more accurately. In one embodiment, the decimation operation reduces the sampling rate of the time lags from 62,500 complex samples per second to 3906.25 or 1953.125 (respectively) complex samples per second while preserving information at ±1562.5 Hz or 781.25 Hz (respectively) (i.e., 80% of the final output bandwidth). For processors that do not implement a single-instruction multiply/accumulate operation, the convolution sum of the RMS bandwidth calculated at 310 may be implemented as represented by the dotted line in FIG. 3 so as to exploit symmetry of the FIR filter taps in order to realize reduced computational complexity. Also, the scaling of the convolution sum by the decimation rate may be incorporated into the FIR filter taps.

Figure 8:
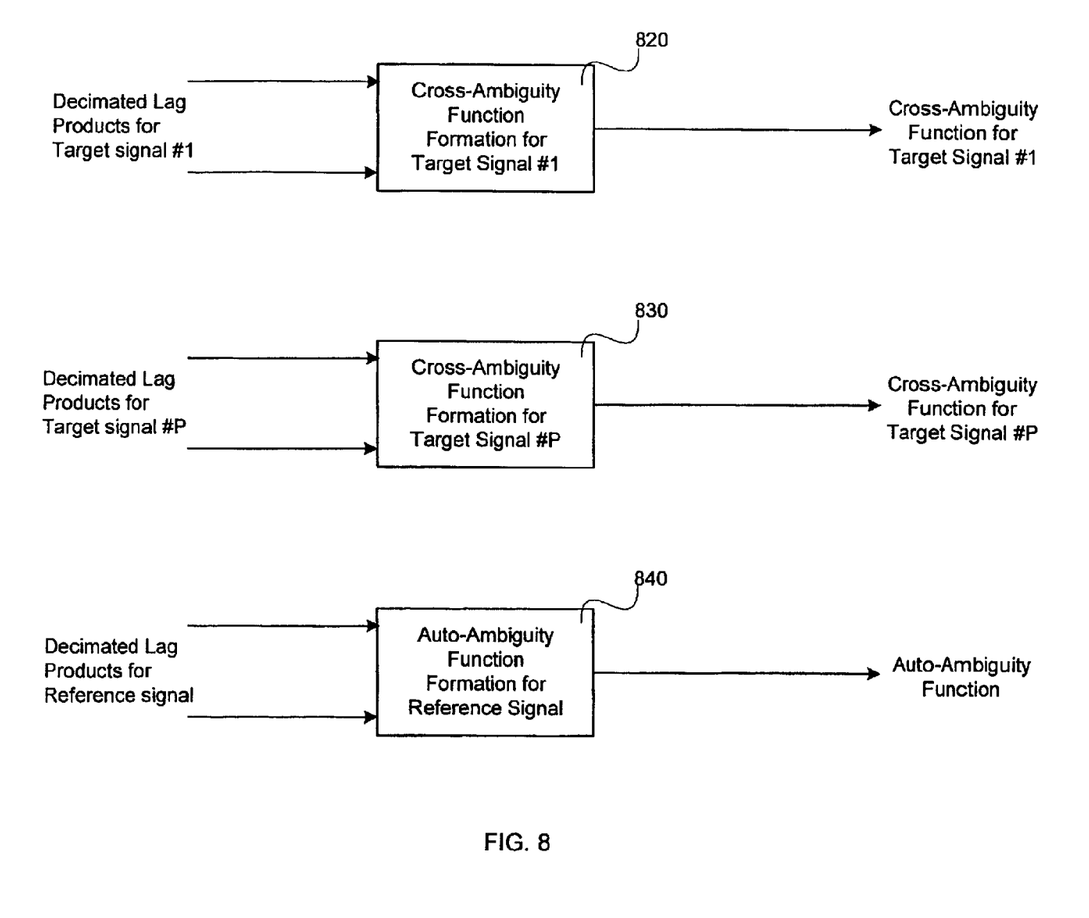
FIG. 8 illustrates a schematic view of ambiguity function formation process in accordance with an embodiment of the present invention.

In step 336 in FIG. 3, the ambiguity function formation functional element accepts the plurality of decimated lag products and computes a cross-ambiguity over coherent processing interval (CPI) of T samples for the each of the target signals. The ambiguity function formation functional element also accepts the plurality of decimated lag products for reference signal and computes an auto-ambiguity over the coherent processing interval of T samples, as shown in FIG. 8. The cross ambiguity function extracts the commonalties between two signals or systems to determine the existence or structure of these commonalties. The coherent processing interval may be overlapped by some factor, $1-1/\rho$, $\rho=2, 4$, etc.

Figure 9:
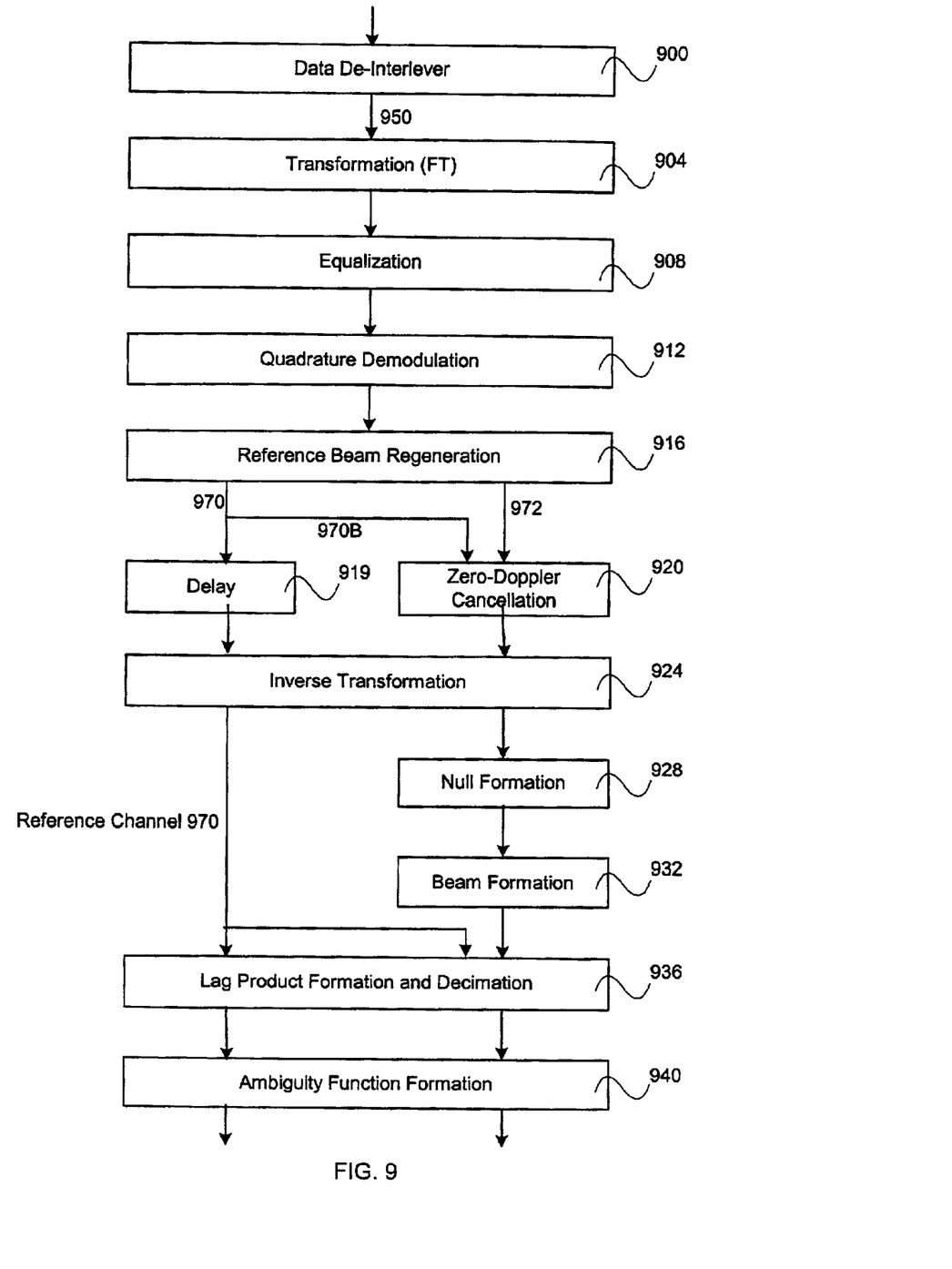
FIG. 9 illustrates a flow chart for pre-detection signal processing in the passive coherent location system in accordance with another embodiment of the present invention.

FIG. 9 shows the signal processing steps at the pre-detection signal processor 240 in accordance with another embodiment of the present invention. The pre-detection processor may use an alternate approach of constant modulus reference regeneration as disclosed in U.S. Pat. No. 5,604,503, which is hereby incorporated by reference, in the absence of a reference channel.

Beginning at step 900, pre-detection signal processor receives digital samples of a target path signal 130 and a reference path signal 140 received at the antenna 200 from the A/D converter subsystem, as blocks of ADC time series data multiplexed together. The blocks of ADC time series data multiplexed together are received by the data de-interlever functional element. In this embodiment, the data de-interleaving functional element does not extract reference signal data and target signal data from the input signal data blocks of time series data. The input signal data including the target signal data and the reference signal data is passed through a channel 950.

In step 904, the data transformation functional element receives the input signal including the target signal data and the reference data through channel 950. The data transformation functional element implements DFT (discrete Fourier transform), preferably by using FFT (fast Fourier transform) operation, required by the subsequent filtering operations. The FFT transforms the input data from a time function to a frequency function, in a manner which is well known by those skilled in the art. Preferably, overlap-save FFT operation may be implemented to cover all ranges, in a manner which is well known by those skilled in the art. The overlap-save FFT operation is repeated independently for each time series data of interest, thus providing a unique "save" block and DFT (discrete Fourier transform) output for each of the input signal data. Preferably, DFT length, N, may be chosen so that it can be factored into a product of small integers (e.g., 2, 3, 4, or 5) so that efficient FFT technique can be used to implement the 2N-length DFT.

In step 908, the equalization functional element receives the output of the data transformation functional element and applies the unique filters.

In step 912, the quadrature demodulation functional element receives the output of the equalization functional element and implements the time-domain signal processing operation schematically shown in FIG. 5 to produce a complex representation of the time series which is centered at zero radians per sample.

In step 916, the reference beam regeneration functional element receives an output of the quadrature demodulation functional element and estimates the reference signal (i.e., D-P signal) and the target signal (i.e., T-P signal) as disclosed in U.S. Pat. No. 5,604,503, which is hereby incorporated by reference.

In step 920, the zero-doppler cancellation functional element receives the target signal and the reference signal estimated by the reference beam regeneration functional element at 916 through a target channel 972 and a reference channel 970B, respectively, and implements time-domain signal processing operations schematically shown in FIG. 4 and described above.

Thereafter, the signal processing continues through the null formation, the beam formation, the lag product formation and decimation, and the ambiguity function formation as described above.

The filtering operations performed prior to the beam formation (i.e., equalization, zero-doppler cancellation, quadrature demodulation and inverse transformation) are implemented using overlap-save fast convolution operations, so that contiguous blocks of input time series data would produce contiguous blocks of output time series data just prior to formation of the estimation auto-ambiguity and cross-ambiguity functions. The overlap-save filtering operations will equalize the target signal signals and minimize the amount of reference signal in each target signal. Additionally, the overlap-save filtering operation produce a complex representation of the target element signal data which is centered around zero radians per sample.

If configured, pre-detection signal processing in the present invention will cancel interfering signal energy from the target signal. Additionally, with proper configuration, the target signal will be transformed into directed beams along specified azimuth angles.

It will be apparent to those skilled in the art that various modifications and variations can be made in the PCL system of the present invention without departing from the spirit or scope of the invention. Thus, it is intended that the present invention covers the modifications and variations of this invention provided that they come within the scope of the appended claims and their equivalents.

What is claimed is:

1. A method for wideband pre-detection signal processing in passive coherent location (PCL) applications comprising:
   receiving a first reference signal and a first target signal;
   filtering the first reference signal with respect to the first target signal using a filter to form a first output reference signal;
   combining the first output reference signal with the first target signal to form a first output target signal;
   receiving a second reference signal and a second target signal;
   updating the filter with respect to a change between the first target signal and the second target signal;
   filtering the second reference signal using the updated filter to form a second output reference signal; and
   combining the second output reference signal with the second target signal to form a second output target signal.

2. The method according to claim 1, wherein the first target signal and the second target signal are reflected from a moving target.

3. The method according to claim 1, wherein the filter includes an adaptive Wiener filter.

4. The method according to claim 1, wherein the filtering steps reduce a portion of the first and second reference signals from the first and second target signals, respectively.

5. The method according to claim 1, wherein the method further includes extracting the first reference signal and the first target signal from a first input signal and the second reference signal and the second target signal from a second input signal.

6. The method according to claim 1, wherein the method further includes filtering the first and second target signals and the first and second reference signals to compensate for channel distortion.

7. The method according to claim 1, wherein the method further includes calculating a root mean square (RMS) bandwidth of the first reference signal.

8. The method according to claim 1, wherein the method further includes demodulating and producing complex-valued representations of the first and second reference signals and the first and second output target signals.

9. The method according to claim 8, wherein the method further includes decimating the complex-valued representations of the first and second reference signals and the first and second output target signals.

10. The method according to claim 1, wherein the method further comprising:
    forming a plurality of target beams for the first output target signal; and
    forming a plurality of decimated lag products for each of the plurality of target beams.

11. The method according to claim 10, wherein the method further includes estimating a cross-ambiguity function for the each of the plurality of target beams using the plurality of lag products.

12. The method according to claim 1, wherein the method further includes forming a plurality of decimated lag products for the first reference signal.

13. The method according to claim 12, wherein the method further includes estimating an auto-ambiguity function for the first reference signal using the plurality of lag products.

14. The method according to claim 1, wherein the method further includes estimating the first reference signal and the first target signal from a first input signal and estimating the second reference signal and the second target signal from a second input signal.

15. The method according to claim 14, wherein estimating the first reference signal includes estimating a magnitude of the reference signal from the first input signal.

16. The method according to claim 14, wherein the method further includes demodulating and producing complex-valued representation of the first input signal before estimating the first reference signal and the first target signal.

17. The method according to claim 16, wherein the method further includes decimating the complex-valued representation of the first input signal.

18. A method for wideband pre-detection signal processing in Passive Coherent Location (PCL) applications comprising:
receiving a target signal and a reference signal;
forming a plurality of target beams from the target signal;
forming a plurality of lag products for each of the plurality of target beams;
decimating each of the plurality of lag products for each of the plurality of target beams;
forming a plurality of lag products for the reference signal; and
decimating each of the plurality of lag products for the reference signal.

19. The method according to claim 18, wherein the method further includes estimating a cross-ambiguity function for the each of the plurality of target beams using the plurality of lag products for each of the plurality of target beams.

20. The method according to claim 18, wherein the method further includes estimating a auto-ambiguity function for the reference signal using the plurality of lag products for the reference signal.

21. The method according to claim 18, wherein the method further includes calculating a root mean square (RMS) bandwidth of the reference signal.

22. The method according to claim 18, wherein the method further includes estimating the reference signal and the target signal from an input signal.

23. The method according to claim 22, wherein the estimating the reference signal includes estimating a magnitude of the reference signal from the input signal.

24. The method according to claim 22, wherein the method further includes filtering the input signal to compensate for channel distortion.

25. A method for wideband pre-detection signal processing for Passive Coherent Location (PCL) applications comprising:
receiving an input signal;
estimating a reference signal and a target signal from the input signal;
reducing a portion of the reference signal in the target signal, wherein the reference signal is adaptively filtered with respect to the target signal and combined with the target signal to form an output target signal;
forming a plurality of target beams for the output target signal;
forming a plurality of decimated lag products for each of the plurality of target beams; and
forming a plurality of decimated lag products for the reference signal.

26. The method according to claim 25, further comprising:
implementing a transformation operation on the input signal;
compensating the input signal for channel distortion; and
demodulating and forming complex-valued representations of the compensated input signal.

27. The method according to claim 25, further comprising:
estimating a cross ambiguity function for the each of plurality of target beams using the plurality of decimated lag products for each of the plurality of target beams; and
estimating an auto ambiguity function for the reference signal using the plurality of decimated lag products for the reference signal.

28. A method for wideband pre-detection signal processing in PCL applications comprising:
receiving an input signal;
extracting a target signal and a reference signal from the input signal;
implementing a transformation operation on the target signal and the reference signal;
compensating the transformed target signal and the transformed reference signal for channel distortion;
reducing a portion of the compensated reference signal in the compensated target signal, wherein the compensated reference signal is adaptively filtered with respect to the compensated target signal and combined with the compensated target signal to form an output target signal;
demodulating and forming complex-valued representations of the compensated reference signal and the output target signal;
implementing an inverse transformation on the compensated reference signal and the output target signal;
forming a plurality of target beams for the output target signal;
forming a plurality of decimated lag products for each of the plurality of target beams;
forming a plurality of decimated lag products for the compensated reference signal;
estimating a cross ambiguity function for the each of plurality of target beams using the plurality of decimated lag products for each of the plurality of target beams; and
estimating an auto ambiguity function for the reference signal using the plurality of decimated lag products for the reference signal.

29. A system for pre-detection signal processing for wideband in PCL applications including a first functional element comprising:
a first sub-element for receiving a first reference signal and a first target signal, and a second reference signal and a second target signal in series;
a second sub-element for filtering the first reference signal with respect to the first target signal using a filter to form a first output reference signal;

a third sub-element for combining the first output reference signal with the first target signal to from a first output target signal; and a fourth sub-element for updating the second element with respect to a change between the first target signal and the second target signal.

30. The system according to claim 29, wherein the filter includes an adaptive Wiener filter.

31. The system according to claim 29, wherein the first target signal is a signal reflected from a moving target.

32. The system according to claim 29, wherein the second sub-element reduces a portion of the first and second reference signals from the first and second target signals, respectively.

33. The system according to claim 29, wherein the system further includes a second functional element for extracting the first reference signal and the first target signal from a first input signal and the second reference signal and the second target signal from a second input signal.

34. The system according to claim 29, wherein the system further includes a second functional element for filtering the first target signal and the first reference signal to compensate for channel distortion.

35. The system according to claim 29, wherein the system further includes a second functional element for calculating a root mean square (RMS) bandwidth of the first reference signal.

36. The system according to claim 29, wherein the system further includes a second functional element for demodulating and producing complex-valued representations of the first reference signal, second reference signal, the first output target signal and the second output target signal.

37. The system according to claim 29, wherein the second functional element includes a sub-element for decimating the complex-valued representations of the first reference signal, second reference signal, the first output target signal and the second output target signal.

38. The system according to claim 29, further including a second functional element comprising:

a first sub-element for forming a plurality of target beams for the first output target signal;

a second sub-element for forming a plurality of lag products for each of the plurality of target beams; and a third sub-element for decimating the plurality of lag products.

39. The system according to claim 38, wherein the third sub-element includes a FIR (finite impulse response) filter/decimator.

40. The system according to claim 38, wherein the system further includes a third functional element for estimating a cross-ambiguity function for the each of the plurality of target beams using the plurality of lag products.

41. The system according to claim 29, wherein the system further includes a second functional element for forming a plurality of decimated lag products for the first reference signal.

42. The system according to claim 41, wherein the system further includes a third functional element for estimating an auto-ambiguity function for the reference signal using the plurality of lag products.

43. The system according to claim 29, wherein the system further includes a second functional element for estimating the first reference signal and the first target signal from a first input signal.

44. A system for pre-detection signal processing for wideband in PCL applications including a first functional element comprising:

a first sub-element for receiving a target signal and a reference signal;

a second sub-element for forming a plurality of target beams for the target signal;

a third sub-element for forming a plurality of lag products for each of the plurality of target beams;

a fourth sub-element for decimating each of the plurality of lag products for each of the plurality of target beams;

a fifth sub-element for forming a plurality of lag products for the reference signal; and a sixth sub-element for decimating each of the plurality of lag products for the reference signal.

45. The system according to claim 44, wherein the sixth sub-element includes a FIR (finite impulse response) filter/decimator.

46. The system according to claim 44, wherein the system further includes a second functional element for estimating a cross-ambiguity function for the each of the plurality of target beams using the plurality of lag products.

47. The system according to claim 44, wherein the system further includes a second functional element for estimating an auto-ambiguity function for the reference signal using the plurality of lag products.

48. The system according to claim 44, wherein the system further includes a second functional element for calculating a root mean square (RMS) bandwidth of the reference signal.

49. The system according to claim 44, wherein the system further includes a second functional element for estimating the reference signal and the target signal from an input signal.

50. The system according to claim 49, wherein the estimating the reference signal includes estimating a magnitude of the reference signal from the input signal.

51. The system according to claim 44, wherein the system further includes a second functional element for filtering the input signal to compensate for channel distortion.

52. A system for pre-detection signal processing for wideband in PCL applications comprising:

a first functional element for receiving an input signal including a target signal and a reference signal;

a second functional element for implementing a transformation operation on the target signal and the reference signal;

a third functional element for compensating the transformed target signal and the transformed reference signal for channel distortion;

a fourth functional element for reducing a portion of the compensated reference signal in the compensated target signal, wherein the compensated reference signal is adaptively filtered with respect to the compensated target signal and combined with the compensated target signal to form an output target signal;

a fifth functional element for demodulating and forming complex-valued representations of the compensated reference signal and the output target signal;

a sixth functional element for forming a plurality of target beams for the output target signal; and a seventh functional element for forming a plurality of decimated lag products for each of the plurality of target beams and a plurality of decimated lag products for the reference signal.

53. The system according to claim 52, wherein the system further includes an eighth functional element for estimating a cross ambiguity function for the each of plurality of target beams using the plurality of decimated lag products for each of the plurality of target beams and estimating an auto ambiguity function for the reference signal using the plurality of decimated lag products for the reference signal.

54. The system according to claim 52, wherein the fourth functional element comprising:

a first sub-element for receiving the compensated reference signal and the compensated target signal;

a second sub-element for filtering the compensated reference signal with respect to the compensated target signal using a filter to form an output reference signal;

a third sub-element for combining the output reference signal with the first compensated target signal to from an output target signal; and a forth sub-element for updating the second sub-element with respect to a change in the compensated target signal.

55. The system according to claim 52, wherein the seventh functional element comprising:

a first sub-element for receiving the plurality of target beams and the reference signal;

a second sub-element for forming a plurality of lag products for each of the plurality of target beams;

a third sub-element for decimating each of the plurality of lag products for each of the plurality of target beams;

a fourth sub-element for forming a plurality of lag products for the reference signal; and a fifth sub-element for decimating each of the plurality of lag products for the reference signal.

56. The system according to claim 52, wherein the system further includes an eighth functional element for extracting the target signal and the reference signal from the input signal.

57. A system for pre-detection signal processing for wideband in PCL applications comprising:

a first functional element for receiving an input signal;

a second functional element for implementing a transformation operation on the input signal;

a third functional element for compensating the transformed input signal for channel distortion;

a fourth functional element for demodulating and forming complex-valued representations of the compensated input signal;

a fifth functional element for estimating a target signal and a reference signal from the input signal received from the fourth functional element;

a sixth functional element for reducing a portion of the reference signal in the target signal, wherein the reference signal is adaptively filtered with respect to the target signal and combined with the target signal to form an output target signal;

a seventh functional element for forming a plurality of target beams for the output target signal; and an eighth functional element for forming a plurality of decimated lag products for each of the plurality of target beams and a plurality of decimated lag products for the reference signal.

58. The system according to claim 57, wherein the system further includes an ninth functional element for estimating a cross ambiguity function for the each of plurality of target beams using the plurality of decimated lag products for each of the plurality of target beams and estimating an auto ambiguity function for the reference signal using the plurality of decimated lag products for the reference signal.

59. The system according to claim 57, wherein the sixth functional element comprising:

a first sub-element for receiving the reference signal and the target signal;

a second sub-element for filtering the reference signal with respect to the target signal using a filter to form an output reference signal;

a third sub-element for combining the output reference signal with the first target signal to from an output target signal; and a forth sub-element for updating the second sub-element with respect to a change in the target signal.

60. The system according to claim 57, wherein the eighth functional element comprising:

a first sub-element for receiving the plurality of target beams and the reference signal;

a second sub-element for forming a plurality of lag products for each of the plurality of target beams;

a third sub-element for decimating each of the plurality of lag products for each of the plurality of target beams;

a fourth sub-element for forming a plurality of lag products for the reference signal; and a fifth sub-element for decimating each of the plurality of lag products for the reference signal.

* * * * *

UNITED STATES PATENT AND TRADEMARK OFFICE
CERTIFICATE OF CORRECTION

PATENT NO.     : 6,801,163 B2                                           Page 1 of 1
DATED          : October 5, 2004
INVENTOR(S)    : Baugh et al.

It is certified that error appears in the above-identified patent and that said Letters Patent is hereby corrected as shown below:

Column 13,
Line 2, delete "from", and insert therefor -- form --.

Column 15,
Line 13, delete "from", and insert therefor -- form --.

Column 16,
Line 14, after "of", insert -- the --;
Line 30, delete "from", and insert therefor -- form --;
Line 32, delete "forth", and insert therefor -- fourth --.

Signed and Sealed this

Thirty-first Day of May, 2005

JON W. DUDAS
*Director of the United States Patent and Trademark Office*